United States Patent [19]

Navratil et al.

[11] Patent Number: 4,743,633

[45] Date of Patent: May 10, 1988

[54] COMPOSITIONS AND METHODS FOR REDUCING THE PERMEABILITY OF UNDERGROUND STRATA

[75] Inventors: Martin Navratil; Mark S. Mitchell, both of Scarborough; Mojmir Sovak, Toronto, all of Canada

[73] Assignee: Borden Company Limited, West Hill, Canada

[21] Appl. No.: 746,540

[22] Filed: Jul. 15, 1985

Related U.S. Application Data

[63] Continuation of Ser. No. 590,034, Mar. 15, 1984, abandoned.

[30] Foreign Application Priority Data

Nov. 18, 1983 [CA] Canada .................................. 441430

[51] Int. Cl.$^4$ ................................................ E02B 3/12
[52] U.S. Cl. ...................... 523/130; 524/596; 524/799; 527/400; 252/8.551; 166/295
[58] Field of Search ................. 523/130, 131, 132; 524/74, 735, 799, 73, 596; 527/400; 252/8.551; 166/295

[56] References Cited

U.S. PATENT DOCUMENTS

| | | | |
|---|---|---|---|
| 2,649,414 | 8/1953 | Salathiel | 523/131 |
| 3,325,426 | 6/1967 | Marham | 523/130 |
| 3,395,033 | 7/1968 | Remer | 524/73 |
| 3,599,433 | 8/1971 | Murata | 523/130 |
| 3,686,872 | 8/1972 | Whitworth | 523/132 |
| 3,696,622 | 10/1972 | Tohma | 523/131 |
| 3,749,172 | 7/1973 | Hessert et al. | 523/130 |
| 3,864,291 | 2/1975 | Enkvist | 524/299 |
| 3,882,938 | 5/1975 | Bernard | 523/130 |
| 3,884,861 | 5/1975 | Whitworth | 523/131 |
| 3,897,827 | 8/1975 | Felber et al. | 523/130 |
| 4,052,359 | 10/1977 | Higgenbottom | 524/74 |
| 4,091,868 | 5/1978 | Kozlowski et al. | |
| 4,212,747 | 7/1980 | Swanson . | |
| 4,246,124 | 1/1981 | Swanson . | |
| 4,275,789 | 6/1981 | Lawrence et al. | |
| 4,663,367 | 5/1987 | Navratil | 524/596 |

FOREIGN PATENT DOCUMENTS

| | | | |
|---|---|---|---|
| 1136793 | 11/1982 | Canada | 524/74 |
| 2304657 | 10/1976 | France | 524/74 |
| 1504451 | 3/1978 | United Kingdom | 524/73 |

OTHER PUBLICATIONS

Westvaco Polychemicals Data Bulletin #801218.
Westvaco Data Sheet REAX 27-A Resin Correactant.
Westvaco Lignochemicals and Their Applications.
Petroleum Society of CIM "Block and Diverting Agents for Enhanced Oil Recovery", Paper No. 82-3-3-54, M. Navratil, M. Mitchell, M. Slovak, Jun., 1982.
American Petroleum Institute Recommended Practice Standard Procedure for Testing Drilling Fluids (8th Ed., Apr. 80).
Reed, Inc., Data Sheet, Temsperse 5001.
Reed, Inc., Data Sheet, Lignosol NSX-135 (Jun. 1981).
Reed, Inc. Data Sheet, Lignosol SFX.
Reed Lignin, Data Sheet, Lignosol FTA (Jun. 1981).
Reed, Inc., Data Sheet, Lignosol HCX (Feb. 1978).
Reed, Inc. Data Sheet, Lignosol AXD (May 1978).
Reed, Inc., Data Sheet, Lignosol XD.
Reed, Inc., Data Sheet, Lignosol TSD.
Reed, Inc., Data Sheet, Lignosol BD.

*Primary Examiner*—C. Warren Ivy
*Attorney, Agent, or Firm*—Robbins & Laramie

[57] ABSTRACT

The invention provides a method for the enhanced recovery of oil from an oil-bearing stratum having a zone of high fluid permeability through plugging of this zone by introducing into the stratum a gelable solution which, in the case of use under moderately high operating temperatures in the stratum, comprises a polyphenolic lignin extract, a formaldehyde source and sufficient alkaline material to give a solution having a pH of at least 9.0 and which, in the case of higher operating temperatures, comprises a lignosulfonate and a source of formaldehyde or tannin in aqueous solution.

8 Claims, 6 Drawing Sheets

COMPOSITIONS AND METHODS FOR REDUCING THE PERMEABILITY OF UNDERGROUND STRATA

This is a continuation of application Ser. No. 590,034, filed Mar. 15, 1984, now abandoned.

This invention relates to compositions and methods of reducing the permeability of underground strata. More specifically, this invention relates to methods of and compositions for reducing the permeability of underground strata, especially oil-bearing strata, through injection of an aqueous gelable solution which will have predictable gelling properties at elevated temperatures, such as those conventionally encountered during enhanced recovery of oil.

When no further production from oil wells can be obtained through conventional mechanical pumping, large quantities of oil often still remain in oil-bearing strata, especially if the oil is a heavy, viscous type of crude oil. It is therefore conventional in the art to use "secondary" or "tertiary" recovery procedures involving injection of a flooding liquid (e.g. water, brine, aqueous solution of a polymer, an aqueous solution of a surfactant, a hydrocarbon fluid or an aqueous solution of caustic soda) through an injector well to flood the oil bearing strata and thereby force at least part of the residual oil into a producer well. Steam has also been injected down the injector well to heat the oil-bearing strata and thereby reduce the viscosity of the oil contained therein for improved flow of oil to the producer well.

Various zones within the oil-bearing strata often differ greatly in fluid permeability. Fractures frequently occur within the oil-bearing strata, whether naturally occurring or due to fracturing which normally is affected near the bottom of a producer well in order to assist oil flow during the initial phase of oil recovery. In addition, thereby may be naturally occurring zones (segments) or streaks of high permeability present in the oil-bearing strata, such as zones of loosely packed sand. Where such high permeability zones are present, flow of flooding fluid across preferentially along these zones and therefore, after a short period of flooding, almost all of the liquid recovered from the producer well will comprise flooding fluid with only small proportions of oil. Thus, fluid handling facilities have to be increased while significant amounts of displaceable oil in zones of low permeability are by-passed. The poor sweep efficiencies induced by the unfavorable flow through zones of high permeability have thus greatly inhibited the efficiency of secondary recovery processes.

In attempting to overcome the aforementioned problems caused by the high permeability zones in the oil bearing stratum, it is known to inject into the stratum solutions which at least partially plug the high permeability zones, thereby greatly decreasing the permeability of these zones, so that flooding fluid injected thereafter is forced to traverse other zones in the oil bearing stratum, thus leading to increased oil recovery. The liquids used to plug the high permeability zones are usually injected via the injector well, but may also be injected via the producer well if necessary. For example, U.S. Pat. No. 3,396,790, issued Aug. 13, 1968 to Eaton, proposes a method of plugging high permeability zones in which water is first injected into a well at a high rate, then a viscous solution comprising sodium silicate, polyacrylamide and water is injected. After the injection of the viscous solution, water is again injected at a high rate and under high pressure, followed by injection of a less viscous solution containing ferrous sulfate and water. By carefully controlling the pressure and injection rates of the viscous and ferrous sulfate solutions, the two solutions react together to form plugs in the high permeability zones.

U.S. Pat. No. 3,749,172, issued July 31, 1973 to Hessert et al, proposes a similar procedure for plugging high permeability zones, but in which the plugging solution contains a polymeric gel.

U.S. Pat. No. 3,882,938, issued May 13, 1975 to Bernard describes a plugging technique involving the injection into the oil-bearing stratum of one or more aqueous solutions of reagents that react within the oil bearing stratum to form a silicate and a gelling agent such as an acid, an ammonium salt, a lower aldehyde, a polyvalent metal salt or an alkali metal aluminate.

U.S. Pat. No. 3,897,827, issued Aug. 5, 1975 to Felber et al, described a gel forming solution consisting of a dichromate activator and a lignosulfonate solution containing an alkali metal or alkaline earth metal halide.

U.S. Pat. No. 3,583,586, issued June 8, 1971 to Stratton, describes a plugging solution containing an ethoxylated condensation produce of a phenol and formaldehyde.

U.S. Pat. No. 4,074,757, issued Feb. 21, 1978 to Felber et al, describes gelation of solutions containing sodium or ammonium lignosulfonate in fresh water or brine at temperatures greater than 250° F. (120° C.) without the addition of any other gelation-promoting agents. Similarly, Canadian Pat. No. 1,041,900 issued Dec. 7, 1978 (and U.S. Pat. No. 3,987,827) describes gelation of lignosulfonate solutions containing 2–20 percent reducing sugars at 250° F. (120° C.) and the use of such lignosulfonate solutions as diverting agents in strata undergoing steam flooding.

U.S. Pat. No. 4,091,868, issued May 30, 1978 to Kozlowski et al, describes processes for plugging oil producing formations using compositions containing a precatalyzed resin which sets to a water-permeable gell: the preferred resin for use in this process is a polyphenolic-paraformaldehyde resin.

U.S. Pat. No. 4,275,789, issued June 30, 1981 to Felber et al, describes the use of solutions containing lignosulfonate and sodium silicate, having total solids contents of from 2 to 10 percent by weight and silicate:lignosulfonate weight ratios of 0.2 to 1, to selectively plug high permeability zones in strata.

U.S. Pat. No. 4,212,747, issued July 15, 1980 to Swanson, proposes as a plugging solution a shear thickening polymer composition containing a high molecular weight polyalkylene oxide polymer with phenol/aldehyde resin, the composition being alkaline.

U.S. Pat. No. 4,246,124 issued Jan. 20, 1981 to Swanson, describes an aqueous plugging solution containing a water-dispersible polymer, an aldehyde and a phenolic compound, which may either be a simple phenol or a tannin such as quebracho or sulfomethylated quebracho.

The wide variety of operating conditions encountered during enhanced recovery of oil, which are due in no small part to the highly diversified physical and chemical character or oil deposits in North America and throughout the world, dictate that any composition intended for plugging zones of high fluid permeability within the oil-bearing strata meet numerous operating requirements. A principal requirement of an effective plugging solution is that its reactivity be sufficiently controllable to plug the high-permeability zones in an operationally feasible gel time over the wide temperature ranges routinely encountered during various conventional recovery procedures. These temperatures range from applications at temperatures from about 50°-150° C., which for convenience are referred to herein as "medium temperatures or MT ranges" and applications at temperatures of about 150°-250° C. or above which are referred to herein as "high temperature or HT ranges". To be effective, plugging or diverting solutions must be fully predictable in performance character, including gel time and resistance to degradation, over the full range of temperature encountered in the oil fields, even in the higher temperatures found in steam flooding techniques which have been proposed to recover heavy bituminous hydrocarbons in tar sand deposits such as those found in Athabaska, Cold Lake, Wabaska and Peace River in Alberta, Canada.

In addition to temperature stability, plugging solutions must be able to gel and not deteriorate during prolonged exposure to brine which is present within many oil-bearing strata. Since high permeability zones to be plugged are often still wet with oil, the plugging solution must also be able to gel and remain stable in this presence of residual oil. The formed gel must also be resistant to all conventional flooding liquids and steam which may be superheated to temperatures of 315° C. or more.

In order that the plugging solution be pumped down a deep injector well and a considerable distance thereafter into a high permeability zone, the plugging solution should have a low viscosity when formulated and should remain low in viscosity for an extended period of time (which may vary from several hours to several weeks) to allow flow into the high permeability zone before rapidly gelling to give a gel of sufficient mechanical strength. It is particularly desirable to have plugging agent solutions which can be tailored by the operator by (1) selection of a particular agent which gives optimum performance over the anticipated operating temperature range and (2) by varying the relative amounts of the components in the plugging solution to give a desired time lag before gelling of the solution begins. It is also sometimes desirable to produce only a reduction in permeability of the high permeability zones and therefore the operator should be able to control the composition of the plugging solution in such a manner as to allow only partial plugging of the high permeability zones. Finally, the plugging solution should not be affected by shear forces to which it is often subjected during pumping into porous high fluid permeability zones.

Prior art plugging solutions have not been successful in meeting all of these operational requirements. In particular, many prior art plugging solutions have been so viscous that it is difficult to pump them with sufficient speed to penetrate deeply the high permeability zones prior to gelling. This susceptibility to at least partial premature gelling has made control of time delay extremely difficult and has often resulted in plugging of the injector well itself. Moreover, these prior art plugging solutions, especially those based on high molecular weight polymers which are subject to physical degradation by pumping shear forces, have been found to produce insufficient mechanical strength in the gel and have often exhibited poor gel performance in the presence of brine and residual oil. Finally, none of the aforementioned prior art patents provide a method for controlling the rate of gelation of the gelable solutions employed which is effective over the range of temperatures, pH conditions and presence of brines of various compositions and concentrations which may be encountered in the field, and in addition the high temperature stability of the plugging compositions at temperatures above 250° C. has not been established.

Applicants' invention therefore addresses the need for compositions and methods for plugging high permeability zones in oil-bearing strata which meet all operating requirements and which are particularly effective in providing improved efficiency in enhanced recovery of oil at sustained operating temperatures between about 50°-250° C. Applicants' invention also provides gelable solutions which will produce gells which withstand temperatures in excess of 250° C.

SUMMARY OF THE INVENTION

Accordingly, this invention provides a composition for use in reducing the permeability of high permeability segments of strata, this composition being an aqueous gelable solution having a pH of at least about 9.0 and comprising an alkaline material, a lignin extract derived as a by-product of the separation of cellulosics from ligninous material in the pulping process of manufacturing paper products, and a source of formaldehyde selected from the group consisting of hexamethylenetetramine, paraformaldehyde, an aqueous formaldehyde solution and phenolformaldehyde resole resin, the total weight of the alkaline material, lignin extract and source of formaldehyde being from about 5 to 30 percent by weight of the solution.

The invention also provides a composition for use in reducing the permeability of high permeability segments of strata, the composition being an aqueous gelable composition having a pH of about 2 to about 11 and comprising an aqueous soluble sulfonated derivative of lignin derived as a by-product of the pulp and paper industry separation of ligninous material from the cellulosics used in the manufacture of paper products, and a gelling agent selected from the group consisting of hexamethylenetetramine, paraformaldehyde, an aqueous formaldehyde solution and sources of tannin, the total weight of the sulfonated derivative and the gelling agent being from about 3 to about 15 percent by weight of the solution.

In another aspect, this invention provides a method for decreasing the fluid permeability of a segment of a formation containing an oil bearing stratum, this segment having a moderately elevated temperature, and greater fluid permeability than the surrounding segments of the formation, which method comprises: injecting into the formation via a well penetrating the formation an aqueous gelable solution having a pH of at least about 9.0, this solution comprising of an alkaline material, a lignin extract derived as a by-product of the separation of cellulosics from ligninous material in the pulping process of manufacturing paper products, and a source of formaldlehyde selected from the group consisting of hexamethylenetetramine, paraformaldehyde, an aqueous formaldehyde solution and phenolformaldehyde resole resin, the total weight of the alkaline material, lignin extract and source of formaldehyde being from about 5 to about 30 percent by weight of the solution; the gelling time of the solution and the rate of injection thereof being such that the solution passes down the well by which it is injected and achieves substantial penetration into the high fluid permeability segment before substantial gelling of the solution occurs; and allowing the solution to gel within the high fluid permeability segment and thereby reduce the fluid permeability of the segment.

Finally, the invention provides a method for decreasing the fluid permeability of a segment of a formation containing an oil-bearing stratum, this segment having a highly elevated temperature and having a greater fluid permeability than the surrounding segments of the formation, which method comprises: injecting into the formation via a well penetrating the stratum an aqueous gelable solution having a pH of about 2 to about 11 and comprising an aqueous soluble sulfonated derivative of lignin derived as a by-product of the pulp and paper industry separation of ligninous material from the cellulosics used in the manufacture of paper products, and a gelling agent selected from the group consisting of hexamethylenetetramine, paraformaldehyde, an aqueous formaldehyde solution and sources of tannin, the total weight of the sulfonated derivative and the gelling agent being from about 3 percent to about 15 percent by weight of the solution; the gelling time of the solution and the rate of injection thereof being such that the solution passes down the well by which it is injected and achieves substantial penetration into the high fluid permeability segment before substantial gelling of the solution occurs; and allowing the solution to gel within the high fluid permeability segment and thereby reduce the fluid permeability of this segment.

The term "moderately elevated temperature" is used herein to denote a temperature of approximately 50° to 150° C., while the term "highly elevated temperature" is used here to denote a temperature of approximately 150° C. to 250° C. However, it will be appreciated by those skilled in the art that no precise guidelines can be given to the temperatures at which the instant methods are employed since the exact temperature range over which a particular composition is useful will depend not only upon the particular components used in the gelable solution to be injected into the high permeability segment of the oil-bearing stratum but also upon a multitude of other factors including the geometry of the high permeability segment, the presence of brines, the exact chemical and physical nature of the high permeability segment, the degree to which the permeability of this segment is to be reduced and the rate of gelation which is desired to achieve in the high permeability segment. Accordingly, the aforementioned temperature ranges are only approximate estimates of the temperature range over which the instant methods can be employed.

The sulfonated lignin derivatives used in the instant method for operation at highly elevated temperatures normally have an ammonium, calcium or sodium cation or a reactive sulfonic acid functionality. Both these soluble sulfonated lignin derivatives and the lignin extracts used in the instant method for operation at moderately elevated temperatures are readily available commercially as byproducts from pulp and paper manufacture.

Hereinafter, references to "medium-temperature" or "MT" compositions and methods refer to the instant compositions and methods for operation at moderately elevated temperatures, those being the compositions and methods employing lignin extracts in combination with formaldehyde, while references to "high temperature" or "HT" solutions and methods refer to the instant compositions and methods for operation at highly elevated temperatures, these being the compositions and methods which use sulfonated lignin derivatives in combination with a gelling agent comprising either a source of formaldehyde or a source of tannin.

DETAILED DESCRIPTION OF THE INVENTION

Figure 1:
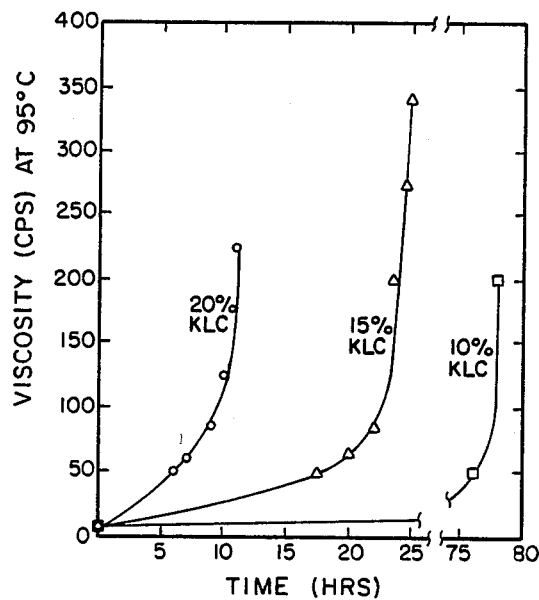
FIG. 1 shows graphs of the viscosity vs. time relationship for various medium temperature ("MT") gelable solutions of varying solids at 95° C.

The prior art plugging agents which rely on relative viscosity differentials between the injected solutions for their effectiveness, such as those described in the Eaton, Hessert and Swanson patents discussed above, and those prior art plugging agents which require a known or controllable gel time, such as those described in Felber patents discussed above, are generally restricted in their appliction by the temperature conditions in the strata to be treated. Thus, a need exists for blocking or plugging agents which can be formulated for optimum application over broad operational temperature ranges.

The gelable aqueous solutions of this invention meet the necessary requirements for use as diverting agents (plugging agents) at both "medium temperature" operating ranges and "high temperature" operating ranges. These diverting agents are prepared utilizing the lignin extract derivatives obtained from the first step, i.e. pulping process of the manufacture of paper wherein cellulose is selectively chemically separated from the secondary components, namely lignin, in the raw vegetable material e.g. wood under controlled conditions of temperature, pressure, time and composition.

In particular, lignin extracts are prepared by reaction of the raw material wood with reagents which are fairly selective toward lignin. These processes are conventionally classified as the Soda process, which utilizes sodium hydroxide; the sulfate or Kraft process utilizing sodium hydroxide, sodium sulfide and sodium bisulfide; the Acid Sulfite process, which utilizes sulfurous acid and sulfur dioxide; and the Neutral Sulfite process, which utilizes sodium sulfite and sodium bisulfite. The liquid residue from the alkaline Soda or Kraft process comprises soluble sodium salt of lignin compounds which can be separated from the "black liquor" by mild acid precipitation to give a lignin derivative which is only water soluble at above pH 9. These lignins used in the medium temperature compositions and methods of this invention are referred to as Kraft lignin, and are either powdered $Na^+$, $NH_4^+$ salt or free acid or liquid concentrates.

Alternatively, in the conventional Sulfite processes, the lignin is separated from the cellulose through a solubilization process involving the sulfonation of lignin to produce lignosulfonates which are water soluble over a very wide pH range of at least 2-11. The lignosulfonates used in the high temperature compositions and methods of this invention may be used either in aqueous solution or in the form of the solid $Na^+$, $Ca^{2+}$, $NH_4^+$ salts.

Suitable instant compositions for optimum performance in the medium temperature ranges may be prepared utilizing Kraft lignin, as described above, either as the produced $Na^+$ or $NH_4^+$ salt, free acid, or liquid concentrate with a formaldehyde source selected from the group consisting essentially of paraformaldehyde, hexamethylenetetramine, phenol-formaldehyde resole resins and aqueous formaldehyde solutions and an alkaline component in an amount sufficient to give a final pH of at least 9.0 and preferably in the range of 10 to 12. The use of medium temperature compositions having pH values above about 12.5 is specifically not recommended because such highly alkaline compositions are expensive to produce and dangerous to handle because of their highly caustic nature. In addition, the gel times of such highly alkaline compositions may in some cases, be outside the useful range, and the compositions possess no known advantages over less alkaline ones. The lignin and formaldehyde are preferably present in a weight ratio of lignin to formaldehyde of from about 2:1 to 10:1, with a ratio in the range of 3:1 to 7:1 being especially preferred; the total dissolved solids of said solutions being from about 5-30% by weight, preferably 8-25% by weight. Outside these ranges of lignin:-formaldehyde ratio, the gels obtained may be of poor quality and/or the compositions may have gel times outside the range useful in practice. These gelable solutions yield gel times of between 1-2 hours at 150° C. and up to 750-1000 hours at operating temperatures of about 50° C. The low end of the solids content range, 5 percent by weight, has been found to be the lower limit for yielding gels which meet commercial performance requirements in this medium temperature range.

The "Kraft" lignin gelable solution used in the medium temperature compositions and methods of this invention is prepared from lignin by-products separated from a wide variety of softwoods, e.g. spruce, pine and fir, and hardwoods e.g. aspen, birch and maple which are either precipitated with acid to yield a dark brown water insoluble powder or recovered as $Na^+$ or $NH_4^+$ salts for further fractionation to yield an acid precipitated form or $Na^+$ or $NH_4^+$ neutralized salts.

The alkaline gelable lignin solutions used in the medium temperature compositions and methods of this invention must, as already stated, have a pH of at least 9.0. Above pH 12, gelation tends to be inhibited, whereas much below pH 10 precipitation of the lignin may occur leaving a non-gelable solution. Obviously, after injection into the oil-bearing stratum, the gelable solution may be diluted by the liquid already present in the stratum which may have a pH substantially different from that of the gelable solution. If the operator has reason to believe that the fluid already present in the stratum will reduce the pH of the lignin gelable solution below about 9.0-10, an alkaline solution having a pH above 9.5 may be injected into the oil-bearing stratum before injection of the lignin gelable solution.

The alkaline material used in the instant MT compositions and methods may be any alkaline material which will yield a sufficiently high pH and which does not adversely affect the gelling properties of the lignin material/formaldehyde mixture. Preferred alkaline materials include sodium hydroxide, potassium hydroxide, sodium carbonate and potassium carbonate. The amount of alkali needed to obtain the required pH depends upon the particular lignin used since, for example, an alkali salt of the lignin will require little, if any, alkali to obtain a pH of 10.

In the instant compositions for use at highly elevated temperature i.e. approximately 150° to 250° C., optimum operational performance has been achieved with a related gelable solution which comprises (1) lignosulfonates, either in an aqueous solution e.g. approximately 50 percent by weight, or in solid form as the $Na^+$, $Ca^{2+}$ or $NH_4^+$ salts and (2) a formaldehyde source related from the group consisting of paraformaldehyde, hexamethylenetetramine, and aqueous formaldehyde solution wherein the weight ratio of lignosulfonate to formaldehyde is preferably between about 2:1 to 10:1, most desirably 2:1 to 5:1. The total dissolved solids of said solutions being from about 3-15% by weight, preferably 3-10% by weight. Although, as discussed in more detail below, at high temperatures lignosulfonates will gel even without formaldehyde but the gels thus obtained, or these obtained will less than the preferred amounts of formaldehyde are less suitable for blocking high fluid permeability segments. On the other hand, use of more than the preferred amounts of formaldehyde produces more expensive compositions having an excessive odor (with consequent changes to personnel using them), and which possess no known advantages over compositions containing the preferred amounts of formaldehyde.

The lignosulfonates of the "HT" aqueous gelable solutions, are also produced from the physico-chemical separation of cellulose from lignin from various trees used in conventional wood pulp and paper manufacture. In particular, a combination of the reagents $NaHSO_3$, $SO_2$ and $H_2SO_4$ are used to selectively sulfonate the lignin molecules. By carefully controlling the sugar content, molecular weight distribution and the particular cation ($Na^+$, $Ca^+$, $NH_4^+$ or $H^+$) a wide variety of lignosulfonates can be produced which have reactivity toward formaldehyde. These lignosulfonates are isolated as either spray dried salts or aqueous liquid concentrates of up to 50 percent solids by weight for use in the process of this invention. Though the exact chemical compositions of the commercially available lignins and lignosulfonates are not known, these materials, as used in this invention, all possess the properties of being water soluble (in alkaline solution in the case of Kraft lignins), capable of combining with formaldehyde and forming a gel therewith. The ability to combine with formaldehyde is conveniently measured as the number of grams of formaldehyde which react in four hours with 100 grams of the dry polyphenolic lignin material dissolved in an aqueous solution at pH 9.5. For purposes of this invention, a formaldehyde combining capacity of 5 is preferred. Although lignosulfonates are soluble over a pH range of 1–14, the instant high temperature compositions have a pH in the range of about 2 to about 11. The condensation reaction between formaldehyde and lignosulfonate is somewhat pH-dependent. Above pH 11–12, the Cannizzaro reaction (discussed in more detail in Example 2 below) decreases the rate of the condensation reaction, while below about pH 1–2, the water solubility of the lignosulfonate is impaired. Using compositions having pH's in the range of about 2 to about 11, thus produces high solubility of lignosulfonate and a relatively high rate of the condensation reaction; also, use of compositions within this pH range reduces the cost of the compositions, since it avoids excessive consumption of acid or base necessary to produce extreme pH values. A pH in the range of 2–6 and 8–11 is preferred for purposes of the condensation reaction between the lignosulfonate and formaldehyde, since the rate of condensation is slowest in the vicinity of neutrality, i.e. pH 7. Therefore, pH adjustment of the aqueous gelable lignosulfonate solution is unnecessary in the practice of this invention, unless, for some reason, compatibility must be maintained between the injected solution and the strata formation material e.g. formations of swellable clays and carbonates where improper pH and/or cation content may result in damage to the formation with consequent decrease in oil recovery. These compositions can yield gel times of about 1–2 hours at 250° C. and up to about 100 hours at about 150° C.

As already mentioned, the instant methods are useful for decreasing the fluid permeability of a segment of a formation containing an oil-bearing stratum. The instant methods may be used to reduce the permeability of high fluid permeability segments lying both inside the oil-bearing stratum and outside this stratum. Probably the most common use of the instant methods will be to treat high fluid permeability zones e.g. sand streak and the like within oil-bearing strata. However, the instant methods are useful for treating high permeability segments lying outside oil-bearing strata, and in particular are useful for treating water-bearing segments which may interfere with enhanced recovery of oil from oil-bearing strata, especially where treatment of the oil-bearing stratum is required. For example, the instant method has been used experimentally in a formation where an oil-bearing stratum containing a very viscous crude oil requiring steam extraction was disposed immediately above a water-saturated layer. Initial attempts to inject steam via an injector well and recover an oil/water mixture from a producer well proved very uneconomic since the proportion of water in the mixture exceeded 99%. It was decided that the very high proportion of water in the mixture recovered was due to absorption of most of the steam by the water-saturated layer rather than the oil-bearing stratum. Accordingly, approximately 30 cubic meters of an instant gelable solution were injected down the injector well into the water-saturated layer, thus forming a "pancake" of gelled material within the water-saturated layer surrounding the injector well. Subsequent injection of steam into the oil-bearing layer via the injector well resulted in a much improved oil:water ratio presumably because substantially all the steam was now entering the oil-bearing stratum rather than being absorbed by the water-saturated layer. Although in this and most other cases encountered in practice, the water-bearing layer is below the oil-bearing straum, those skilled in the art will appreciate that the instant methods can also be used to block water-containing layers, for example quicksand layers, disposed above the oil-bearing stratum.

It has been found that the instant composition based upon lignosulfonates and formaldehydes work well in substantially oil-free sand, as will be found in "watered out" or "steamed out" segments within an oil-bearing stratum, but the blocking effectiveness of these instant compositions is substantially impaired when contacted with tar sands which have not been significantly purged of their heavy crude. However, this decrease in effectiveness is not necessarily detrimental to the usefulness of the instant method using such lignosulfonate/formaldehyde-based compositions as in many cases the operator will only wish to lower the relative permeability of the various segments of the stratum undergoing flooding operations rather than completely block the high permeability segments, especially when substantial amounts of residual oil remain within the particular stratum which the operator wishes to modify. However, in view of this reduced blocking effectiveness in contact with tar sands, further experiments were conducted to attempt to produce a high temperature composition which would have good blocking effectiveness in tar sands still containing a substantial amount of bitumen. It was discovered that if, instead of using a source of formaldehyde as the gelling agent for the lignosulfonate, a source of tannin was substituted, the blocking effectiveness of the compositions was not adversely affected by residual oil in the high permeability segments. Preferred sources of tannin for use in the instant compositions are mimosa bark extract and "quebracho bark" extract.

In formulating such instant lignosulfonate/tannin compositions, it was found that mimosa tannin extract was soluble in the lignosulfonate at the unadjusted pH of the lignosulfonate solution, which was typically 3–3.5, provided the ratio lignosulfonate to mimosa tannin extract was at least 3:1 by weight. If the ratio was below this value, the mimosa tannin extract dissolved only in a basic aqueous medium with a pH of at least 9. Once dissolved in the lignosulfonate solution, the lignosulfonate/mimosa tannin was stable and yielded good quality gels at 200° C. after about 15 hours. Although the lignosulfonate:mimosa tannin extract ratio could be varied over a wide range, it was found that the best results were achieved with a lignosulfonate:tannin ratio of about 3:1. Ratios of less than about 1:1 yielded weak, poorly formed gels, while ratios much in excess of about 5:1 gave gels which lost their blocking capacity in the presence of tar sands in substantially the same manner as the instant lignosulfonate/formaldehyde compositions. When using lignosulfonate solutions containing less than about 5 percent by weight of the lignosulfonate, the mimosa tannin extract would be dissolved if the pH was first adjusted to above 9 with a suitable base such as sodium hydroxide or potassium hydroxide, and once the mimosa—tannin extract had been dissolved in this aqueous solution, the pH solution could be dropped to at least 4 without the mimosa tannin extract precipitating provided that the lignosulfonate:mimosa tannin ratio did not fall below about 1:1. However, a composition containing at least about 5 percent by weight of lignosulfonate was required to yield satisfactory blocking characteristics in the experimental models used to simulate tar sands.

The instant lignosulfonate/tannin compositions will gel without any formaldehyde being present at all, a result which is somewhat surprising since it has not previously been reported that gelation of lignosulfonates can be achieved with tannins.

The gelable solutions of this invention have relatively low viscosities when first formed, such viscosities normally being in the range of 2–30 cps., for ease of pumping and injection into the formation. As shown, for example, by the data in FIG. 1 below, the viscosity of the gelable solutions remain substantially unchanged for a relatively long period of time, which allows for placement of the gelling solution in the desired location, prior to a very rapid increase in the gelling solution viscosity to form a gel of substantial mechanical strength. This ability of the gelable solutions of this invention to remain non-viscous for protracted periods of time and then form a strong gel is particularly useful for selectively plugging streaks or fractures at a substantial distance from the well through which the solutions are injected. Where it is desired to reduce or eliminate the fluid permeability of a high permeability zone at a distance from the injection well, a non-gelable displacing fluid may be injected into the formation stratum through the same well after the gelable solution has been injected to prevent excessive loss of permeability around the bottom of this well. This displacing fluid may be water or a viscous aqueous solution of a polymer, suitable polymers for such purpose being well-known to those skilled in the art.

Figure 6:
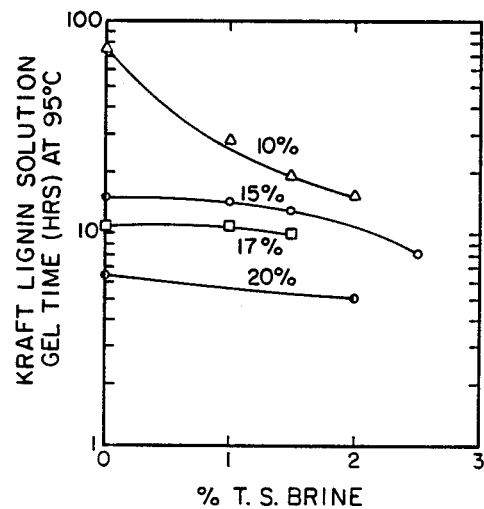
FIG. 6 shows graphs of the gel time vs. percent total solids of the standard experimental brine for various "MT" gelable solutions of varying solids content at 95° C.

Oil-bearing strata frequently contain brines, typically comprising solutions of sodium, calcium and magnesium chlorides. A model of typical reservoir brine was prepared by combining the chlorides of sodium, calcium and magnesium in a molar ratio of 20:2:1, respectively. As shown in FIG. 6 below, Kraft lignin based gelable solutions can tolerate i.e., gel in the presence of up to about 3 percent of total dissolved salts, depending upon the concentration of the gelable solution. Since the gelable solution will dilute any brine still present in the reservoir after the initial flooding recovery operations, in practice the instant methods utilizing Kraft lignin can be used in oil-bearing strata containing brine having considerably higher levels of dissolved salts. The lignosulfonate based compositions, which have the unusual property of being operative over a pH range of at least 2 to 11 have a brine tolerance in the acid range which is limited only by the equilibrium concentration of ions which may cause precipitation or "salting out" of the lignosulfonate from solution, which is defined by the solubility products expression as follows:

$$Ksp = [M^{m+}]^a [SSL^{a-}]^m$$

wherein M is a metal cation of charge m+ and SSL is a molecule of lignosulfonate of charge a−.

In the basic pH range, the brine tolerance of the lignosulfonate solution is limited mainly by the mass of insoluble divalent metal hydroxides which are precipitated together with the formation of less soluble magnesium lignosulfonates and not by the consequent lowering of pH which occurs, since the lignosulfonates themselves are soluble over substantially the entire pH range.

Often the concentration of brine is relatively low within the high-permeability zones of the strata being treated due to the washing out of these zones by the flooding fluid used during the initial part of the secondary oil recovery process, while the concentration of brine remains relatively high in the zones of lower permeability. Since the gelable compositions of this invention, in the alkaline range, tend to form insoluble particles in the presence of alkaline earth metal ions such as $Ca^{++}$ and $Mg^{++}$ in the brine, the gelable solutions which enter the high permeability zones form insoluble material at the interfaces between the high permeability zones and the surrounding zones of lower permeability where the gelable solution comes in contact with the brine in the lower permeability zones. The resultant deposition of insoluble material at these interfaces limits any substantial penetration of the gelable solution into the surrounding oil-bearing zones which have not been previously swept by flooding fluid. This treatment, which is self-conforming, can be further enhanced by a pre-flush of the high permeability zone with water or other conventional flooding fluid.

The tolerance of the gelable solutions of this invention to brine also allows use of the instant method in locations in which fresh water is difficult to obtain since the instant compositions can be made up using brine instead of fresh water provided that, in the case of the medium temperature compositions the brine does not contain more than 0.275 weight percent of cations having a valence greater than one and forming insoluble hydroxides.

The gelable solutions used in the instant method are capable of achieving substantially complete gelation in the presence of oil-wet sand or minerals which are often present in the high permeability zones in oil-bearing strata. The gelable solutions, though not adherent to the grains of oil-wet mineral, do form a gel in the interstitial voids between the grains of oil-wet mineral thereby greatly reducing the permeability to a degree sufficient for purposes of facilitating enhanced recovery of oil.

A significant advantage of the method of this invention is that the concentration of the components of the gelable solutions can be adjusted so as to form gels which do not completely block or destroy the permeability of the treated part or zone of the oil-bearing strata but only reduce the permeability thereof. In particular, through adjustment of the total weight of Kraft lignin, formaldehyde and alkaline solids in the range of 5–10 percent by weight of the gelable solution for application at temperature up to 150° C. and adjustment of the total weight of lignosulfonate and formaldehyde or tannin within the range of 3–5 percent by weight of gelable solution for operations at 150° C.–250° C. or above, the permeability of the treated zones can be reduced without risk of inadvertently stopping the flow of the subsequently injected flooding fluid through the reservoir. In this way, the risk of having to fracture a blocked well or having to drill another injector well in an adjacent unblocked part of the reservoir can be substantially eliminated.

It is the particular advantage of the method of this invention that, unlike all prior art plugging agents used to block high permeability zones, the gelable solutions of this invention are formulated so as to form gels of substantial strength which can be used for prolonged periods of time at the temperatures typically employed in steam recovery of heavy oils, i.e. temperatures up to 290° C., with little or no gel deterioration.

Once the permeability of the high permeability segments of the strata being treated have been reduced by the instant methods, any conventional techniques may be used to effect enhanced recovery of oil from the treated strata. Thus, a flooding fluid may be injected into the oil-bearing stratum, either through the well through which the gelable solution was injected or from some other well, in order to displace oil from the strata and to allow the displaced oil to be recovered from a well penetrating the stratum. As those skilled in the art are aware, appropriate flooding fluids include water, water vapor, brine, an aqueous solution of a polymer, an aqueous solution of a surfactant, a hydrocarbon fluid, or an aqueous solution of caustic soda.

The instant methods may be especially useful in the technique for recovery of oil known as "steam stimulation" or more colloquially as "huff and puff". In this technique, steam is injected into the oil-bearing stratum for a prolonged period, which may be several weeks to several months. The injected steam heats and pressurizes the oil-bearing stratum. Once this heating and pressurization of the oil-bearing stratum has reached a desired level, injection of steam is terminated and the well through which the steam was injected functions as a producer well, allowing a mixture of hot oil and water to be produced until the oil-bearing stratum pressure decreases to a point at which the well does not produce any more oil/water mixture. Injection of the steam is then recommended. When using steam stimulation, it often happens that the steam being injected into the oil-bearing stratum moves through a segment of high fluid permeability within that stratum into a water-containing segment, which typically is present just below the oil-bearing stratum. Such movement of the steam into the water-containing segment is highly undesirable since a substantial amount of steam is consumed heating up the water-containing segment, resulting not only in excessive consumption of steam during the injection stage but often production of an excessive amount of water from the well during the recovery stage. The process by which water from the water-containing segment rises through the oil-bearing stratum and enters the well during the recovery phase is usually referred to as "water coning". By treating the high fluid permeability segment in the oil-bearing stratum by one of the instant methods prior to commencing steam injection, the permeability of the high permeability segment can be greatly reduced, thereby greatly reducing if not eliminating the loss of steam and excessive production of water caused by leakage of steam via the high permeability segment into the water-containing segment during steam injection.

The following examples are now given by way of illustration only and are not to be construed as limiting the scope of the instant invention which is defined by the appended claims.

EXAMPLE 1

This example illustrates the variation of the gel times of the medium temperature, i.e. up to 150° C., "MT" gelable solutions used in the instant method with temperature and with the total concentration of ligninous polyphenolic vegetable material and formaldehyde donor, selected from the group consisting of formaldehyde, formaldehyde solution, hexamethylenetetramine and a formaldehyde donating phenolformaldehyde resole resin, in the gelable solutions. A typical resole resin employed for this purpose was catalyzed by calcium cations, neutralized by carbon dioxide to neutral pH, had a starting formaldehyde to phenol molar raio of 2.8–3.4:1 and a final free formaldehyde content of about 7 percent.

The gelable solutions used in this and subsequent examples involving "MT" gelable solutions were prepared from a dry powder comprising the sodium salt of Kraft lignin available commercially under the trademark Indulin C, from Westvaco, Chemical Division.

To prepare a solution designated X% below, using a 50 percent formaldehyde solution, X parts by weight of dry ligninous powder was dissolved by slow addition with rapid stirring in $$100 - \left(X + \frac{2X}{Y}\right)$$

parts by weight of water, where Y is the lignin to formaldehyde ratio being used for that particular gelable solution. It was found that Y=5 was suitable for solutions containing greater than 10 percent by weight of lignin and Y=3 was suitable for solutions containing 10 percent or less by weight of lignin. If paraformaldehyde is to be employed, the water component becomes $$100 - \left(X + \frac{X}{Y}\right),$$

if hexamethylenetetramine is the formaldehyde source, then the formula becomes $$100 - \left(X + \frac{0.78X}{Y}\right)$$

and if a phenol-formaldehyde resole resin was used, the formula becomes a function of the phenol to formaldehyde ratio of the resin.

To this solution was then added X/Y parts by weight of the formaldehyde equivalent of the reagent employed as the formaldehyde source, except in the case of phenolformaldehyde resole, where the water was added with stirring to the resin followed by addition of the lignin to this solution.

These components were then stirred together for 15 minutes to ensure homogeneity, brought rapidly to the temperature at which the gel time was to be tested and the gel time measured from the end of the 15 minute mixing period.

Because of the amount of formaldehyde donor present in the solutions, particularly those involving a phenolformaldehyde resole, the designated percentage solution does not reflect the actual % total solids present in the solutions. For example, at a nominal concentration of 15 percent lignin solids, the total solids using a formaldehyde solution having Y=5 is actually 18 percent and for a particular phenol-formaldehyde resole, is actually 21 percent. However, for the sake of continuity, the % lignin solids is quoted as the percent solution in each case.

Nominally 20 percent, 15 percent and 10 percent solutions were made up using a 50 percent formaldehyde solution as the formaldehyde source using this method. the change in solution viscosity as a function of time at 95° C. was then determined as shown in FIG. 1. As will be seen from the curves in this figure, the viscosity of the gelable solutions remains almost unchanged for most of the gel time. Towards the end of the gel time, the originally low viscosity gelable solutions rapidly lost normal fluid characteristics and their viscosity increased until they formed a strong gel. It will also be seen from this figure that increases in lignin and formaldehyde solids tend to decrease the gel time. The long periods of time in which the viscosity of the gelable solutions remain virtually unchanged allow easy pumping of the solutions into deep wells and substantial distances into high permeability zones within or outside the oil-bearing strata.

Figure 2:
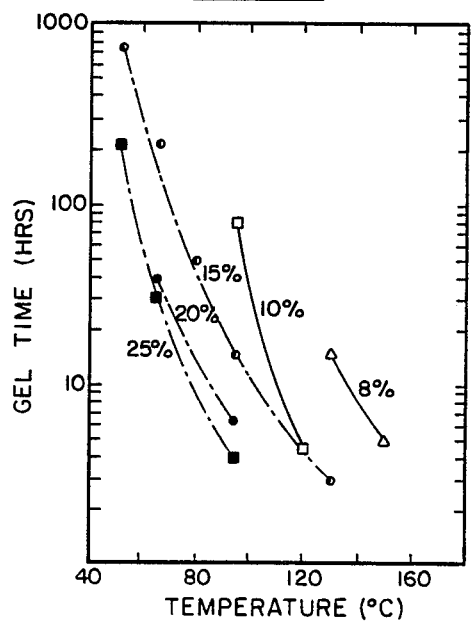
FIG. 2 shows graphs of the gel time vs. temperature relationship for various "MT" gelable solutions.

FIG. 2 illustrates the variations of gel time against temperature for solutions of constant composition, specifically 8 perent, 10 percent, 15 percent, 20 percent and 25 percent lignin solids. The curves in this figure show that in all cases gel time increases with decreasing temperature with comparable slopes for compositions of the same lignin to formaldehyde ratio.

It should be pointed out at this time that, due to the reactivity of lignin in any form, including the sulfonated form, toward formaldehyde, these solutions may be prepared in advance and stored at temperatures of 25° C. or less for up to 30–60 days in the case of 20 percent lignin solutions and for at least 6 months in the case of solutions containing 15 percent lignin solids or less. The sulfonated lignin based gelable solutions with less than 10 percent lignosulfonate solids can be stored at 15° C. for at least one year without appreciable viscosity increase. This pre-reaction of the formaldehyde and lignin at room temperature is termed methylolation and is the low energy, first step in crosslinking of lignin via methylene or ether bridging units provided by formaldehyde. It is so named because reaction of formaldehyde with an active center on a lignin molecule produces a methylol group which then subsequently condenses with another methylolated molecule yielding an ether linkage and a molecule of water. Subsequent chemical reaction converts the ether linkage into the more stable methylene linkage. It is the existence of this second, higher energy rate-determining step which allows pre-methylolation of the gelable solution without a significant change in gelation characteristics for the aforementioned storage periods.

EXAMPLE 2

Figure 3:
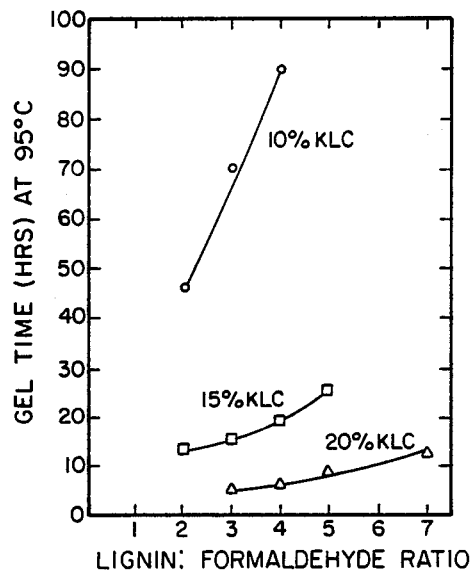
FIG. 3 shows graphs of the gel time vs. lignin to formaldehyde weight ratio at 95° C. for various "MT" gelable solutions of varying solids content.

This example illustrates the variation in gel time of the medium temperature ("MT") gelable solutions used in the instant method with lignin to formaldehyde weight ratio and the concentration of lignin solids in the gelable solutions. Solutions comprising 10 percent, 15 percent and 20 percent lignin solids were made up in the same manner as in Example 1 except that the respective weights of the formaldehyde, in this case a 50 percent by weight solution, and water were adjusted to yield the lignin to formaldehyde ratios shown in FIG. 3.

As can be seen from the figure, gel time tends to increase with an increase in the lignin to formaldehyde ratio; this fact reflects the decrease in formaldehyde solids for such a change in the ratio. The sensitivity to the change in this ratio increases with decreasing lignin solids. For the nominally 10 percent solution, the upper limit of the ratio was arbitrarily cut off at 5:1 as any ratio in excess of this formulation gave either non-gelling solutions or solutions which required excessive periods, i.e., greater than 100 hours, to gel. Where extended gel times are required however, these formulations may be found to be suitable under circumstances perculiar to a given operator's particular field condition. For solutions of increasing lignin solids it can be seen that the ratio may be extended, indicating that a certain minimum weight percentage of formaldehyde must be present to cause gelation to occur; for Kraft lignin this percentage appears to be in the vicinity of 2.5 percent to 3 percent of the weight of the solution. At the lower limits of this ratio, the cut-off point is determined by the weight of formaldehyde necessary, under the conditions of alkalinity and temperature, to cause the Cannizzaro reaction to take precedence over the crosslinking reaction between lignin and formaldehyde. The cannizzaro is that reaction where under conditions of high alkalinity and temperature a disproportionation of formaldehyde occurs yielding methanol and a formate salt as shown in equation 2.

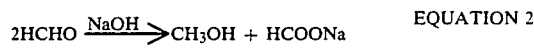

$$2HCHO \xrightarrow{NaOH} CH_3OH + HCOONa \qquad \text{EQUATION 2}$$

The occurence of the Cannizzaro reaction is signaled by a drop in pH and precipitation of the lignin, giving a non-gelling mixture. Under the conditions of FIG. 3, that is 95° C. and pH 10–10.5, the weight percentage of formaldehyde required to make the Cannizzaro a dominant reaction is in the vicinity of 8–10 percent by weight of the solution. Thus, for the weight percentage of lignin typically employed to give gelable solutions of reasonable gel times, by oil field requirements, the optimum concentration of a formaldehyde donor is between about 3 percent to about 5 percent by weight.

EXAMPLE 3

Figure 4:
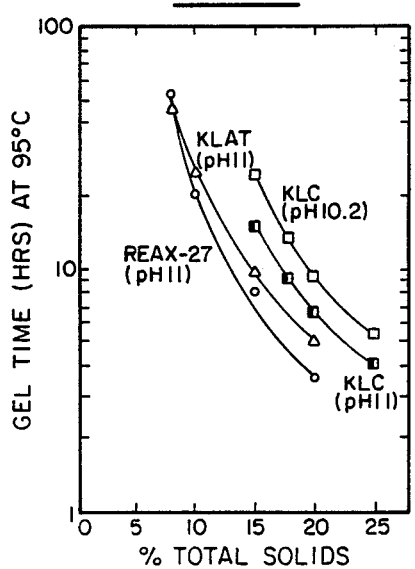
FIG. 4 shows graphs of gel time vs. percent total lignin solids in the "MT" gelable solutions at 95° C. for various sources of lignin.

This example illustrates the typical range of reactivities to be found in commercially available lignin products. Also shown is the trend expected for the variation in gel time with pH of the gelable solutions for a given solids at 95° C. In FIG. 4 are the gel time vs. lignin solids graphs at 95° C. for three commercially available lignins. These are known as KLC Kraft lignin C (Indulin C, a sodium salt of lignin available from Westvaco at the address given below), KLAT, which is the acidified form of lignin and which requires an alkaline solution to cause dissolution of the lignin solids, and REAX-27, all of which form gelable solutions with from 8 percent to 25 percent lignin solids at pH 11 and 95° C. (REAX-27 is a Kraft pine lignin product available from Westvaco Chemical Division, Polychemicals Department, P.O. Box 70848, Charleston Heights, S.C. 29405 and is described in Westvaco Polychemicals Data Bulletin #801218 and in a Westvaco data sheet "Reax 27-A Resin Correactant".) For comparative purposes a KLC curve is included at pH 10.2. It can be seen from this curve that in the range of pH 10–11 gel time decreases with increasing pH. By separate experiments not shown, it was determined that this relationship holds from the lower pH limit necessary for the solubility of the lignin to about pH 11.5. Above pH 11.5–12, the reaction is inhibited by the high hydroxide ion concentration and below about pH 9.0, the lignin is soluble and therefore non-gelling.

EXAMPLE 4

Figure 5:
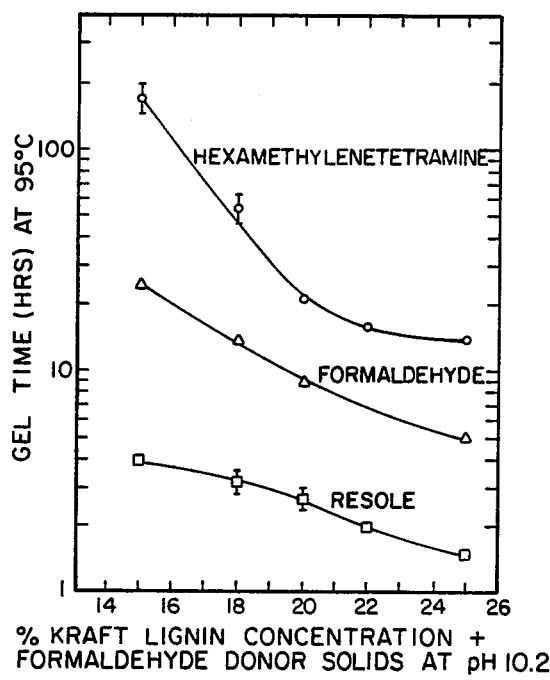
FIG. 5 shows graphs of gel time vs. percent total lignin solids in the gelable solutions at 95° C. for various sources of formaldehyde.

This example illustrates the variation in gel time with KLC total solids and with the source of formaldehyde in the gelable solutions at 95° C. As shown in FIG. 5, the three formaldehyde sources, hexamethylenetetramine (HMTA), 50 percent by weight aqueous formaldehyde solutions and an aqueous phenol-formaldehyde resole resin, gave gelable solutions with reactivities dependent on the nature of the formaldehyde donor. The hexamethylenetetramine-based solutions were the least reactive of the group, the prerequisite decomposition of the multi-cyclic HMTA molecule being responsible for lowering the reactivity of the lignin solutions. The formaldehyde molecules gave a more reactive group as the HCHO molecules could react directly with the lignin reactive sites. The solutions based on the phenolformaldehyde resole gave the most reactive solutions as a condensation between lignin and a partially reacted phenolformaldehyde solution can proceed more rapidly than the condensation of lignin and formaldehyde alone due to the inherently higher reactivity of the resole resin. This example, together with Example 3 shows how the gel time of a solution of given solids may be manipulated through changes in any of pH, lignin source and formaldehyde source.

Example 5

This example illustrates the effect of brines on the gel times of selected "MT" gelable solutions used in the instant method. Solutions with 10 percent, 15 percent, 17 percent and 20 percent Kraft lignin "C" solids were made up in the same way as Example 1 except that a portion of the water was replaced by brines containing sodium chloride, calcium chloride dihydrate and magnesium chloride hexahydrate in a molar ratio of 20:2:1 with 10 percent total dissolved salts such that the total brine concentration in the gelable solutions varied from 0 to 3 percent. The gel times of the 10 percent, 15 percent, 17 percent and 20 percent KLC solutions were then determined at 95° C. It is shown in FIG. 6 that Kraft lignin solutions can tolerate mono- and divalent cations up to certain concentrations. In the case of Kraft lignin systems, the practical "no-gel" point is defined as that concentration of brine which causes a gel to set up at room temperature. As this gel is readily reduced to a low viscosity (less than 10 cps) solution upon heating to 95° C., it is not a gel structure formed via covalent links between the lignin molecules but is rather likely an ionic interaction between the divalent cations of the brine and the anionic centers of the lignin. It was found that, for a decreasing concentration of lignin, it was necessary to have an increasing concentration of brine to cause this unstable gel structure to form at room temperature. Also, as the initial pH for all solutions was pH 11 and the addition of brine to the nongel point resulted in a pH no lower than 10.5, the precipitation of lignin cannot be invoked as a no-gel mechanism. However, the brine treated lignin systems formed weaker, paste-like light brown solids. Since it is unlikely that a heated mixing tank for the blocking agent would be practical or desirable to maintain a low solution viscosity, the gelation phenomenon defines the tolerance of this system to brine.

EXAMPLE 6

This example illustrates the variation in the gel times of the high temperature ("HT") lignosulfonate based gelable solutions used in the instant method with temperature and with the total concentration of lignosulfonate and formaldehyde donor, be it paraformaldehyde, an aqueous formaldehyde solution or hexamethylenetetramine in the gelable solutions.

The gelable solutions used in this and subsequent examples involving "HT" gelable solutions were prepared from either a dry powder or an up to 50 weight percent solution comprising the free lignosulfonic acid or the $Na^+$, $Ca^{2+}$ or $NH_4^+$ salt of lignosulfonic acid or admixtures thereof, as previously described in the description of this invention.

Preparation of lignosulfonate solutions for the experiments described is very similar to that already described for "MT" lignin-based gelable solutions. The principal differences between the two types of gelable solutions are the pH ranges associated with the solutions and the temperatures over which the systems effectively operate and therefore the relative reactivity towards formaldehyde. Using a conventional high temperature, high pressure vessel equipped with a thermocouple-controlled resistance heating unit, samples of lignosulfonate-based gelable solutions (using a commercially available 50 percent by weight lignosulfonate solution obtained from Tembec, Inc., available commercially under the trade designation, SSL F, as a representative lignosulfonate), were gelled using a 50 weight percent formaldehyde solution at a lignosulfonate to formaldehyde ratio of 3:1 at temperatures between 150° C. and 250° C. The results of these experiments are shown in the graphs of FIG. 7.

Figure 7:
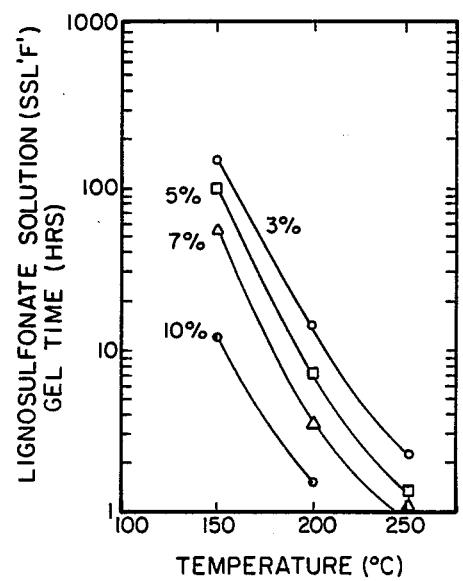
FIG. 7 shows graphs of the gel time vs. temperature relationships for various "HT" gelable solutions used in the instant method and having varying solids content.

As shown in FIG. 7, gel time decreases with increasing temperature and also with increasing lignosulfonate solids content. Separate experiments, not shown here, confirm that these systems are soluble and operable over at least the pH range of pH 2 to pH 11. As optimal gelation properties could be obtained with solutions comprising from 3 percent to 10 percent weight of lignosulfonate at the temperture examined, subsequent experiments used this range of lignosulfonate solids which was found to require a lignosulfonate to formaldehyde ratio of about, but not restricted to, 3:1.

In addition to the experiments shown in FIG. 7, control runs were performed in which lignosulfonates solutions to which no formaldehyde had been added were subjected to the same temperature conditions as the instant HT compositions. It was found that the product formed from the control compositions was a heterogeneous mass of insoluble particles in an aqueous matrix. Thus, although there is evidence of a self-condensation reaction around 200° C. or, alternatively, of a pyrolytic cleavage of the solubilizing sulfonate functionality yielding insoluble ligninous material, the products of such a reaction would be of little use as a blocking agent, due to the negligible strength exhibited by the products of the self-condensation or cleavage reaction. Accordingly, in the instant HT compositions which do not contain tannin as a gelling agent, the formaldehyde is an essential component to produce proper gelation of the solution and a product having sufficient mechanical strength after gelation.

EXAMPLE 7

This example illustrates the variation in properties and reactivity to be found in some commercially available lignosulfonates applicable in the instant method. Table I shows the gel time at 200° C. of various lignosulfonates at 5 percent lignosulfonate solids with a lignosulfonate to formaldehyde ratio of 3:1 as obtained from the Chemical Division of Reed Paper Ltd. and Tembec, Inc.

TABLE 1
PROPERTIES OF LIGNOSULFONATE "HT" GELABLE SOLUTIONS

| Designation | State | Color | Solution pH | Cation | Gel Time 200° C. (hrs) |
|---|---|---|---|---|---|
| SSL F | liquid | dark brown | 2.5 | $NH_4^+$ | 6–8 |
| SSL FD | liquid | dark brown | 3.5 | $NH_4^+$ | 4–8 |
| NSX-135 | solid | light yellow brown | 7.1 | $Na^+$ | 12–13 |
| SFX | solid | gold-yellow | 7.4 | $Na^+$ | no gel |
| FTA | solid | dark brown | 10.2 | $Na^+$ | |
| HCX | solid | med. brown | 9.5 | $Na^+$ | 20–22 |
| ADX-65 | solid | light brown | 5.0 | $Na^+$ | 13–14 |
| XD | solid | light yellow brown | 6.6 | $Na^+$ | no gel |
| TSD | solid | gold brown | 4.3 | $NH_4^+$ | 8–10 |
| BD | solid | light yellow brown | 4.2 | $Ca^{2+}$ | 8–10 |

Lignosulfonates SSL F and FD are liquids having a viscosity of 150 cps. at 25° C., a pH of 8, a solids content of 48%, a specific gravity of 1.23 at 25° C., a freezing point of −5° C. and infinite solubility in water. They have a lignin content of 65%, contain 5% of reducing bodies, less than 2% of sugars by the HPLC method, 6.9% of methoxyl groups, 1% of nitrogen, 6% of sulfur, 6% of sodium, 13% of ash and are essentially free of calcium.

Lignosulfonate NSX-135 has a moisture content of 5%, a pH of 7 and contains 10.0% of reducing bodies, 0.05% of calcium, 8.0% of sodium, 0.7% of non-sulfonate sulfur, 5.8% of sulfonate sulfur to 20.3% of ash and 0.05% of material insoluble in a 27% aqueous solution.

Lignosulfonate SFX is a desugared sodium lignosulfonate of medium molecular weight containing 5.0% of moisture, 8.0% of sodium, 5.6% of sulfonate sulfur, 6.9% of methoxyl, 24.0% of ash, and is essentially free of simple sugars. It contains 0.1% of insolubles and the pH of a 27% aqueous solution is 6.8.

Lignosulfonate FTA has a pH of 10.0 and contains 5.0% of moisture, 0% of reducing bodies, 0.1% of calcium, 10.0% of sodium, 0.7% of non-sulfonate sulfur, 5.6% of sulfonate sulfur, 28.0% of ash, and 0.15% by volume of material insoluble in a 27% aqueous solution.

Lignosulfonate HCX contains 5.0% of moisture, not more than 0.3% of calcium (measured as CaO), 28.1% of ash, 0% of reducing bodies, 6.1% of sulfur, 0.2% of insolubles, 6.0% of methoxyl, 0.8% of sulfonate sulfur and a 30% aqueous solution has a pH of 10.5.

Lignosulfonate ADX-65 has a moisture content of 5.0% and contains 0.1% of calcium (as CaO), 21.7% of ash, 5.7% of reducing bodies, 5.8% of total sulfur, 0.3% by volume of material insoluble in a 30% aqueous solution, 6.7% of methoxyl, 3.5% of sulfonate sulfur and 7.3% of sodium. A 30% aqueous solution has a pH of 4.6.

Lignosulfonate XD is a full spectrum sodium lignosulfonate containing wood sugars. It has a pH in 27% aqueous solution of 7.0 and contains 5.0% of moisture, 7.2% of sodium, 6.2% of sulfonate sulfur, 7.1% of methoxyl, 21.0% of ash, 0.07% of calcium, 12% of simple sugars and 0.1% of insolubles.

Lignosulfonate TSD is a full spectrum ammonium lignosulfonate containing wood sugars. It has a pH in 27% aqueous solution of 4.5 and contains 5.0% of moisture, 5.8% of sulfonate sulfur, 7.3% of methoxyl, 1.5% of ash, 0.2% of calcium, 8% of simple sugars and 0.1% of insolubles.

Lignosulfonate BD is a calcium lignosulfonate containing wood sugars. It has a pH in 27% aqueous solution of 4.5 and contains 5.0% of moisture, 5.3% of sulfonate sulfur, 7.6% of methoxyl, 10.0% of ash, 4.1% of calcium, 15% of simple sugars and 0.2% of insolubles.

EXAMPLE 8

This example illustrates the mechanical strength of the "MT" gelable solutions.

Capillary tubes of 0.105–0.111 or 0.205–0.210 cm. internal diameter were filled with typical "MT" gelable solutions of 15 percent, 13 percent and 10 percent Kraft lignin solids with lignin to formaldehyde ratios ranging from 5:1 to 2:1 and gelled at 95° C. in sealed containers. Pressure was then applied to the gel in steps of 1 psi pressure increase per minute. The maximum pressure drop sustained by the gel before yielding was measured and the yield stress T calculated therefrom by the standard equation:

$$T = (d\Delta P)/4L$$

where:
d is the internal diameter of the capillary (cm)
$\Delta P$ is the maximum pressure drop sustained before yielding (psi)
L is the length of the gel segment in the capillary (cm).

This equation assumes that the fluids involved are incompressible but this assumption does not involve serious error. The yield stresses observed in these experiments are shown in Table II below.

TABLE II
YIELD STRESS OF GELLED SOLUTIONS

| Solution Concentration | L:F | Yield Stress (psi) |
|---|---|---|
| 15 | 5:1 | 0.23 |
| 15 | 4:1 | 0.22 |
| 15 | 3:1 | 0.87 |
| 13 | 4:1 | 0.15 |
| 13 | 3:1 | 0.37 |
| 10 | 2:1 | 0.049 |

The above data shows that the yield stress of the gelled composition increases with the concentration of lignin solids for a given lignin to formaldehyde ratio. Also note that as this ratio decreases, i.e., as the amount of formaldehyde relative to the lignin solids increases, the yield stress tends to increase. Maximum yield stress typically develops within 2–3 days of gelation at 95° C. Note that this type of test was shown to be not applicable to the "HT" gelable solutions as the gases developed during the reaction at high temperatures prevented the formation of a continuous gel segment within the capillary tubes. For this reason the blocking effectiveness, as described in a later example, rather than yield stress for lignosulfonate based gelable solutions was measured.

EXAMPLE 9

Figure 8:
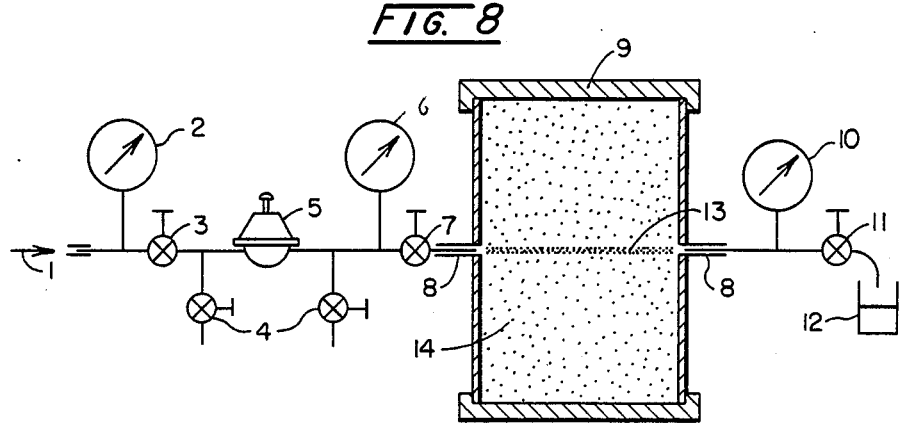
FIG. 8 is a schematic diagram of the vessel used to simulate bitumen containing sand zones used in experiments to demonstrate the improvement in oil recovery experienced when employing "MT" or "HT" blocking agents in the steam recovery of heavy oil.

This example illustrates the improvement in oil recovery from a heterogeneous formation treated with "HT" and "MT" gelable solutions by the instant methods. The experimental model of a heterogeneous formation used in these experiments is shown in FIG. 8. This model was used in the simulation of steam assisted recovery of bitumen from medium grade tar sand samples obtained from the Alberta Research Council Sample Bank. The model comprises a stainless steel cylinder test vessel 9 (10.2 cm I.D.×15.9 cm long) fitted with removable stainless steel caps on each end. Located in the center of the cylinder body and running at 90° to the longitudinal axis of the cylinder and 180° apart were the steam inlet and outlet ports 8. A portion of a bitumen-containing stratum was simulated by packing the model with said tar sand 14 to a density of 1.8 to 2.0 g cm$^{-3}$ with communication between the inlet and outlet ports being provided by a high permeability streak of Ottawa sand 13 0.63×0.63 cm and located in line with the sand inlet and outlet ports.

Figure 9:
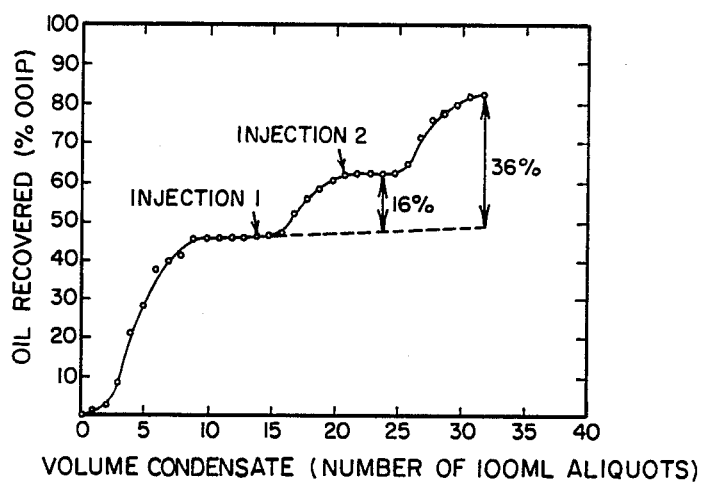
FIG. 9 is a graph showing the proportion of oil recovered from the simulator shown in FIG. 8 as a function of the "MT" blocking agent injected thereinto.

Primary recovery of the bitumen was then initiated by applying a 40 psi steam gradient against the bitumen-containing zone. Steam is introduced through inlet 1, pressure gauge 2 and shut-off valve 3 to provide a regulated flow of steam through regulator 5, having associated condensation drains 4, through inlet gauge 6 and inlet shut-off valve 7 to provide steam by means of connectors 8 to the inlet port of the test vessel 9. As the applied steam progressively transferred heat to the tar sand, thereby mobilizing the bitumen, a valve 11 on the outlet end of the connector 8 from the outlet port of the zone was used to provide a back-pressure measured by gauge 10 against the steam flow to ensure a uniform flow of steam condensate and displaced oil which is collected at sample collector 12. In this way the volume of condensate applied and oil displaced could be determined as shown in FIG. 9. When the water to oil ratio exceeded about 40, as indicated by the asymptotic approach to approximately 45 percent oil recovery shown in FIG. 10, the primary flood was discontinued and a 30 ml. volume of "MT" blocking agent comprising a solution of Kraft lignin "C" and a phenol-formaldehyde resole resin at 12 percent lignin solids, as described in Example 1, was injected through the steam inlet port into the swept tar sand and the artifical high permeability streak, followed by a fresh water afterflush of 7 ml. The model system was then kept at 105° C. for 12-16 hours to ensure thorough gelation of the injected blocking agent. After a suitable gelation period, the zone was allowed to cool to circa room temperature and was subsequently reconnected to the steam supply and the secondary steam injection into the simulator was initiated. With the previously described back-pressure maintenance method, a regulated flow of condensate and oil was monitored yielding the enhanced oil recovery portion of the curve in FIG. 9. It can be seen from this section of FIG. 9. that the above treatment was effective in causing a substantial increase in the proportion of oil recovered from the simulator by diverting the applied steam into previously unswept, oil-bearing zones.

Figure 10:
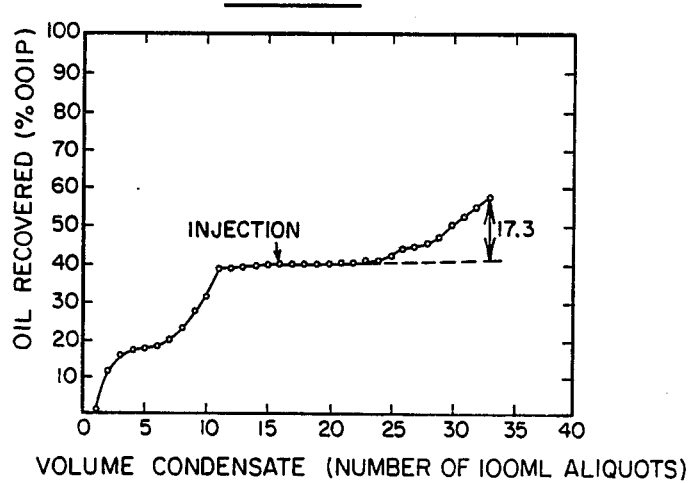
FIG. 10 is a graph showing the proportion of oil recovered from the simulator shown in FIG. 8 as a function of the "HT" gelable solution injected thereinto.

A similar experiment was performed using an "HT" gelable solution comprising a lignosulfonate, Lignosol FTA, from the Chemical Division, Reed Paper Co., Ltd., a lignosulfonate to formaldehyde ratio equalling 3:1 at a 10 percent total lignosulfonate solids as the blocking agent. The simulator, as shown in FIG. 8, was subjected to a primary steam flood as previously described and blocked by injection of the above "HT" gelable solution in the same manner as described for the "MT" blocking agent. After a gelation period of 142 hours at 180°-190° C., steam flooding was reinitiated and secondary recovery of oil monitored as previously described for the "MT" blocking agent. The results of this experiment are shown in FIG. 10. It can be seen from this figure that the "HT" gelable solution was also effective in causing a substantial increase in the proportion of oil recovered from the simulator by diverting the applied steam into previously unswept, oil-bearing zones.

To ensure that the blocking effectiveness displayed by the instant compositions in the treatment of simulated bitumen containing zones was due, at least primarily, to the addition of the instant compositions, a control run was performed in which a tar sand packed tube of 0.5" external diameter and 6" long (13 mm. by 152 mm.) with an initial permeability to 1 percent standard brine of 900 mD, was subjected to the same temperature conditions as in previous experiments i.e. 200° C. for 14-16 hours. After cooling to room temperature, the 1 percent standard brine permeability of the tube was re-checked and found to be 1050 mD, indicating that the heating and cooling cycle was not responsible for the observed decrease in permeability in the experiments using the instant compositions and that accordingly, the instant compositions, not a heat-induced internal shift of the hydrocarbon material, was the cause of the permeability reduction within the sample.

EXAMPLE 10

This example illustrates the thermal stability of the gels formed in the instant method. The gelable solutions used in these experiments were the solutions described in Example 9. Samples were prepared by injecting the above "MT" gelable solutions into water-wet Ottawa sand, with an initial brine permeability of circa 65D, contained within a simle tubular simulator. The simulator was then shut in and a suitable gelation period allowed at a suitable temperature. The brine permeability after this treatment was found to be zero up to at least 90 psi applied pressure gradient per linear foot of the said simulator. The open tubular simulator containing the blocked Ottawa sand sample was then placed in the high temperature vessel and surrounded with a 2 percent total solids solution of brine, of the proportions described in the detailed description of this disclosure and heated to 275° C.-290° C. for an extended period. After 14 days, the permeability to brine was still less than 1 percent of the initial permeability. This was found to be the case for permeability testing temperatures of 25° C. Subsequent permeability tests done on specimens aged up to 84 days at 275° C.-290° C. gave the same result, namely an insignificant permeability increase after the extended thermal treatment; in this case the final permeability was 34 mD. A similar test run on the "HT" gelable solution described in Example 9 gave comparable results. The permeability of the Ottawa testing sand after treatment with the lignosulfonate blocking agent was determined to be Ki=966 mD. After a treatment period of 20 days at 275° C.-290° C., the permeability was rechecked at 25° C. and found to be virtually unchanged; it increased only to 1320 mD. When the treatment period was extended to 80 days, there was a significant and unexpected drop in the permeability of the test sample to 21 mD. As with the "MT" gels, the permeability of the treated samples remained very low after an extended aging period. Those results show that the instant method can be used to treat oil-bearing strata where it is desired or necessary to use steam injection to recover oil from the oil-bearing strata.

EXAMPLE 11

This example illustrates how the instant high temperature compositions containing a source of tannin provide good blocking characteristics of higher permeability zones in tar sand.

An instant high-temperature composition was formulated comprising a lignosulfonate, SSL-QF (obtained from Tembec, Inc.) and a mimosa tannin powder in a lignosulfonate:mimosa tannin ratio of 4.1:1.35 by weight and a lignosulfonate to formaldehyde ratio of 4:1 by weight with a total solids content of 6.35 percent; preparation of the composition was effected in a manner similar to that described for the other instant high temperture compositions mentioned above. This composition was injected by a syringe through the usual fittings, into a tar sand zone simulator comprising a 0.95 cm internal diameter by 15.2 cm long stainless steel tube packed with Athabasca tar sand to an initial packing density of about 1.7 g/cc., with an initial permeability to 1 percent standard brine of 1050 mD. After the instant composition was injected, the tube was closed and heated to 200° C. for 14–16 hours. After cooling to room temperature, the permeability to 1 percent standard brine was re-measured and found to have been reduced to 21 mD.

EXAMPLE 12

This example illustrates an instant lignosulfonate/-mimosa tannin composition from which formaldehyde has been eliminated without adversely effecting gel quality or blocking effectiveness.

An instant high temperature gelable solution was prepared in the same manner as in Example 11 except that the formaldehyde was eliminated and the lignosulfonate:mimosa tannin ratio altered to 5:1.65 and total solids altered to 6.65 percent by weight of the solution. The solution was used to treat a tar sand tube simulator similar to that used in Example 11 having an initial permeability to 1 percent standard brine of 690 mD. After treatment with the instant solution, the simulator was closed and heated to 200° C. for 14–15 hours. After cooling, the permeability to 1 percent standard brine was remeasured and found to be 78 mD.

A separately gelled sample of the instant composition used in the above experiment displayed good gel characteristics, that is to say it produced a uniformly gelled mass instead of the insoluble discrete particles of lignosulfonate in an aqueous matrix as the case for the gelation of SSL-QF without formaldehyde (see Example 6 above), thus, although the nature of the reaction between tannin and lignosulfonate is not yet understood, this experiment does show that this reaction at 200° C. produces a gel capable of blocking tar sand zones with substantial residual oil saturation.

EXAMPLE 13

This example illustrates the reduction in brine permeability which can be achieved with various medium temperature and high temperature composition of the invention at operating temperatures of about 100°–170° C.

Figure 11:
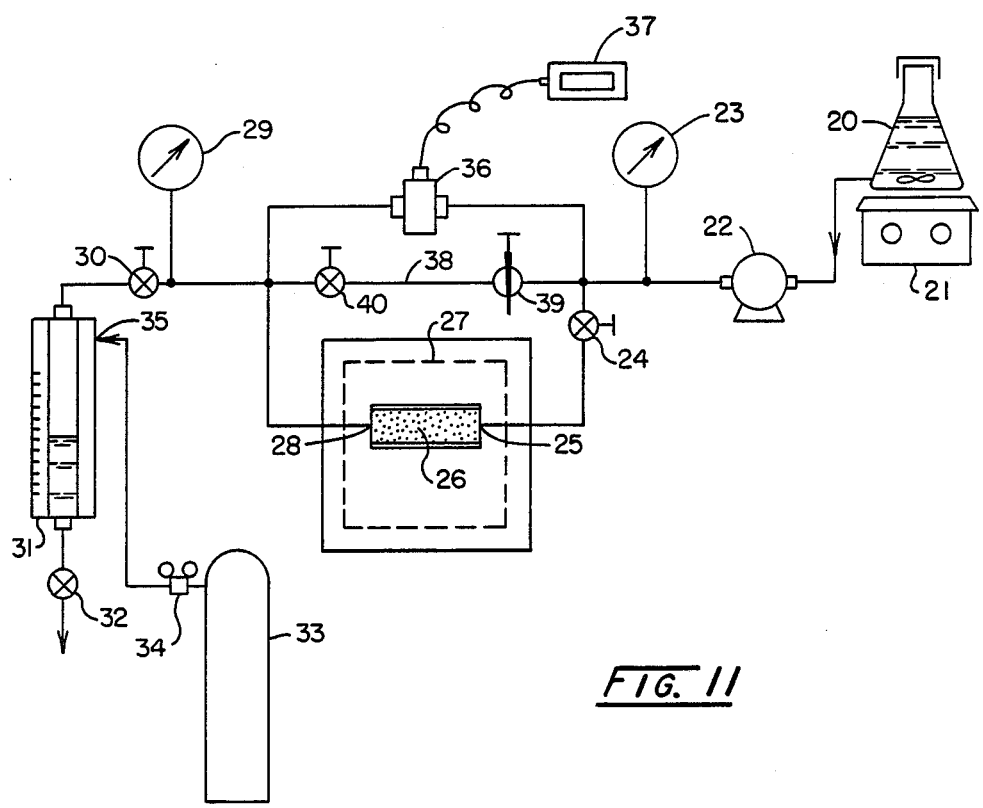
FIG. 11 is a schematic diagram (not to scale) of an experimental apparatus for measuring water and brine permeabilities at temperatures of 100°–170° C.

The apparatus used in these experiments is shown in FIG. 11. This apparatus comprises an eluent reservoir 20 supported and stirred by, and capable of being heated by, a hot plate/stirrer 21. From the reservoir 20, a liquid supply line extends via a metering pump 22, past a pressure gauge 23 and via a valve 24 to the inlet 25 of a test core 26, which is surrounded by an oven 27. From the outlet 28 of the test core 26, a line extends past a pressure gauge 29 and via a valve 30 to a pressure flow cell 31 provided with a drain valve 32. Pressurization of the cell 31 is effected by means of a gas cylinder 33 which supplies gas via a pressure regulator 34 to the gas inlet 35 of the cell 31.

A differential pressure transducer 36 is arranged so as to measure the pressure drop across the valve 24 and the test core 26, the pressure difference measured on the transducer 36 being displayed on a digital readout 37. The valve 24 and the test core 26 are also bridged via a bypass line 38 in which are connected in series a metering valve 39 and a shut-off valve 40.

The apparatus shown in FIG. 11 is used as follows. The eluent fluid in the reservoir 20 is maintained by the hot plate 21 at the desired temperature and is supplied by the pump 22 via the valve 24 to the test core 26 which is maintained by the oven 27 at the desired temperature. The pressure drop across the test core is measured by the differential pressure transducer 36 and displayed on the display 37. The back-pressure necessary to prevent evaporation of the eluant liquid is measured on the gauge 29, this back-pressure being set by the pressure regulator 34. The pressure flow cell 31 also serves as a collector of the eluent liquid from the test core 26; the cell 31 can be emptied by opening the drain valve 32 without depressurizing the system.

After the material in the test core 26 has been treated by one of the instant methods, the permeability thereof can become so low that even the minimum liquid delivery rate capable of being produced by the pump 22 could produce so high a pressure gradient across the test core 26 that the gel formed therein would fracture. Accordingly, if the pressure differential across the test core approaches a potentially excessive value, the valve 24 is closed and the valve 40 (which is closed during normal operation of the apparatus) is opened. The metering valve 39 is then adjusted to provide a pressure differential across the core at or near the maximum to which the core should be exposed. The valve 24 is then opened and the eluent liquid allowed to flow through the core and the metering valve 39 simultaneously. This opening of the valve 24 lowers the pressure differential because the total flow rate remains constant. The residual core permeability (K) is then calculated from the following equation, which is derived from Darcy's equation:

$$K = Q n \frac{l_1}{A_1} \left( \frac{1}{\Delta P} - \frac{1}{\Delta P_2} \right)$$

wherein:

$A_1$ is the cross sectional area of the core in cm.$^2$;

K is the permeability of the core to the liquid in Darcies;

$l_1$ is the length of the core in centimeters;

Q is the flow rate of the flooding liquid in cm$^3$s$^{-1}$;

ΔP is the pressure drop when the valves 40, 39 and 24 are opened, measured in atmospheres;

ΔP$_2$ is the pressure differential with the valve 24 closed, measured in atmospheres; and n is the viscosity of the liquid at the test temperature in mPa.s.

As the core permeability approaches zero, the pressure drop recorded after the valve 24 is opened, becomes equal to the pressure drop recorded with the valves 39 and 40 open but with the valve 24 closed.

The simulator was packed with water-washed Athabasca tar sand by stirring the sand in water, decanting the water (three times) and then drying the sand at 105° C. This treatment yielded a sand sample with an initial permeability to 1 percent standard brine of 8–10D with residual oil saturation of 2.6 percent by weight. The sample was injected with 0.5 pore volume of an instant medium temperature composition having a lignin:formaldehyde weight ratio of 3:1 and 16 percent total solids, the composition being gelled at 105° C. for 24 hours. The gelled sample was then placed in the oven and raised to 170° C. After this treatment, the permeability of the simulator at 170° C. was measured and found to be 0 mD. A similar experiment carried out with an instant high temperature composition comprising 5 percent by weight of SSL-QF lignosulfonate and 1.65 percent by weight mimosa tannin extract gelled at 200° C. for 64 hours produced a permeability to 1 percent standard brine at 170° C. of 10 mD. Thus, both the instant compositions shared a significant capacity to reduce the brine permeability of the simulated tar sand zones both at room temperature and at operating temperatures of 170° C.

Our experiments indicate that the low permeability produced by the instant methods is not temperature dependent below temperatures required to produce substantial degradation of the gelled composition, such temperatures being higher than 275°–290° C. Thus, permeability measurements taken at room temperature are representative of the permeabilities which will be produced in the high permeability segments of strata at any operation temperature below the temperature required to cause substantial degradation of the gel.

It will be apparent to those skilled in the art, that numerous changes and improvements may be made in the instant method without departing from the scope of the invention. Accordingly, the foregoing description is to be construed in an illustrative and not in a limitative sense, the scope of the invention being defined solely by the appended claims.

We claim:

1. A gelable composition for use in reducing the permeability of high permeability segments of strata, said composition being an aqueous gelable solution having a pH of at least about 9.0 and consisting essentially of an alkaline material which is capable of providing said pH, a lignin-containing extract derived from the black liquor by mild acid precipitation, said black liquor derived as a by-product of the separation of cellulosics from ligninous material in the Kraft and Soda pulping processes of manufacturing paper products, and a source of formaldehyde selected from the group consisting of hexamethylenetetramine, paraformaldehyde, an aqueous formaldehyde solution and a formaldehyde-donating phenol-formaldehyde resole resin, the weight ratio of lignin to formaldehyde available in said source for reaction with said lignin-containing extract is 2:1–10:1, the total weight of said alkaline material, lignin extract and source of formaldehyde being from about 5 to about 30 percent by weight of said solution, said composition being a liquid having a viscosity not in excess of about 30 mPa.s. at 20° C. when first formed, and said viscosity remaining substantially unchanged for a relatively long period of time prior to a very rapid increase to form a gel of substantial mechanical strength, said composition being stable and undergoing minimal viscosity changes for at least 30 days upon storage at 25° C. or below, being capable of flowing substantial distances into said segments from the point of injection before gelling and undergoing a transformation to a solid gel over at least part of the temperature range of about 50° to about 150° C. within a period of from about one hour at 150° C. and high solids content up to about 1,000 hours at 50° C. and low solids content, said solid gel being stable to prolonged exposure to brine, residual oil and flooding liquids and further being stable over the full temperature range.

2. A composition according to claim 1 wherein said lignin-containing extract is a Kraft lignin extract comprising sodium salts of lignin compounds produced by treating wood with sodium hydroxide and sodium sulfide.

3. A composition according to claim 1 wherein said composition further comprises not more than about 0.3 weight percent of cations having a valency greater than one and forming insoluble hydroxides.

4. A composition according to claim 1 having a pH of about 10 to about 11.

5. A composition according to claim 1 wherein said alkaline material comprises any one or more of sodium hydroxide, potassium hydroxide, sodium carbonate and potassium carbonate.

6. A composition according to claim 1 wherein the viscosity of said composition, when first formed, is from about 2 to about 3 mPa.s at 20° C.

7. A gelable composition for use in reducing the permeability of high permeability segments of strata, said composition being an aqueous gelable solution having a pH of about 2 to about 11 and consisting essentially of an aqueous soluble sulfonated derivative of lignin derived as a by-product of the Acid Sulfite and Neutral Sulfite processes in the pulp and paper industry separation of ligninous material from the cellulosics used in the manufacture of paper products, and a gelling agent selected from the group consisting of tannins and a source of formaldehyde selected from the group consisting of hexamethylenetetramine, paraformaldehyde, and aqueous formaldehyde solution, the weight ratio of said sulfonated derivative of lignin to said gelling agent is 1:1–5:1 if said gelling agent is tannin or 2:1–10:1 if said gelling agent is a source of formaldehyde and said ratio is based on the amount of formaldehyde available in said source for reaction with said sulfonated derivative of lignin, the total weight of said sulfonated derivative and said gelling agent being from about 3 percent to about 15 percent by weight of said solution, said composition being a liquid having a viscosity not in excess of about 30 mPa.s. at 20° C. when first formed, and said viscosity remaining substantially unchanged for a relatively long period of time prior to a very rapid increase to form a gel of substantial mechanical strength, said composition being stable and undergoing minimal viscosity changes for at least 30 days upon storage at 25° C. or below, being capable of flowing substantial distances into said segments from the point of injection before gelling and undergoing a transformation to a solid gel over at least part of the temperature range of about 150° to about 250° C. within a period of from about one hour at 250° C. and high solids content up to about 100 hours at 150° C. and low solids content, said solid gel being stable to prolonged exposure to brine, residual oil and flooding liquids and further being stable over the full temperature range.

8. A composition according to claim 7 wherein said composition is in the basic pH range and further comprises not more than about 0.3 weight percent of cations having a valency greater than one and forming insoluble hydroxides.

* * * * *